Patented June 27, 1933

1,915,999

UNITED STATES PATENT OFFICE

HERBERT C. JENNISON, OF BRIDGEPORT, CONNECTICUT, ASSIGNOR TO THE AMERICAN BRASS COMPANY, OF WATERBURY, CONNECTICUT, A CORPORATION OF CONNECTICUT

NONFERROUS ALLOY

No Drawing.   Application filed November 3, 1932.   Serial No. 641,040.

This invention relates to a copper base alloy, particularly an alloy which can be readily hard drawn into wire and when so drawn will have a tensile strength in the neighborhood of 125,000 pounds per square inch with an electrical conductivity of 16% or over at 20° C.

My preferred alloy comprises approximately 8.0% zinc, 0.7% silicon, 0.15% manganese and the balance copper; but the silicon may vary from 0.01% to 0.95%, the zinc fom 6.5% to 13% and the manganese from 0.01% to 1.5%, with the balance copper.

This alloy has very valuable properties in addition to those above mentioned. If hot rolls readily and may be easily drawn into wire on wire drawing machines. Usually alloys having physical properties approximating the above noted tensile strength and electrical conductivity are very difficult to draw and tear the wire dies out very rapidly. This alloy, however, can be readily drawn without damaging the dies. Due to its high strength and conductivity it is well adapted for cables or stranded conductors.

This alloy is also advantageous for numerous other uses. It is adapted for use in making cold headed bolts or hot headed bolts, U-bolts and saddles, and washers and nuts for same. The alloy is particularly desirable for making metal wool by the cutting process or by drawing into fine wire, rolling into tinsel, etc.

The alloy is also suitable for welding and use for welding rods, and it may be autogenously welded, spot welded, and used as a welding rod in all types of welding. The material may also be brazed.

This alloy may be hot and cold rolled, and may also be extruded and hot forged and hot pressed. In addition to the hot working qualities and its adaptability for drawing into wire as above described, it may be made into rods, tubes, sheets, and shapes, and also drawn, stamped or spun into cups and other forms of drawn metal articles.

Also on account of its high electrical conductivity and hardness it can be used for electrodes in various forms on spot welding machines.

Having thus set forth the nature of my invention, what I claim is:

1. A copper base alloy composed of silicon from 0.10 percent to 0.90 percent, zinc from 6.5 percent to 13 percent, manganese from 0.10 percent to 1.5 percent and balance copper.

2. A copper base alloy composed of approximately 8.0 percent zinc, 0.70 percent silicon, 0.15 percent manganese, and balance copper.

3. A worked metal article composed of an alloy of 0.10 percent to 0.90 percent silicon, 6.5 percent to 13 percent zinc, 0.10 percent to 1.5 percent manganese and balance copper.

4. A worked metal article composed of an alloy of approximately 8.0 percent zinc, 0.70 percent silicon, 0.15 percent manganese, and balance copper.

5. A cold drawn wire composed of an alloy of 0.10 percent to 0.90 percent silicon, 6.5 percent to 13 percent zinc, 0.10 percent to 1.5 percent manganese, and balance copper.

6. A cold drawn wire composed of an alloy of approximately 8.0 percent zinc, 0.70 percent silicon, 0.15 percent manganese, and balance copper.

In testimony whereof I affix my signature.

HERBERT C. JENNISON.